(12) United States Patent
Cox

(10) Patent No.: US 8,594,445 B2
(45) Date of Patent: Nov. 26, 2013

(54) FAST BILATERAL FILTERING USING RECTANGULAR REGIONS

(75) Inventor: Christopher B. Cox, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2374 days.

(21) Appl. No.: 11/292,184

(22) Filed: Nov. 29, 2005

(65) Prior Publication Data

US 2013/0127894 A1    May 23, 2013

(51) Int. Cl.
*G06K 9/40*    (2006.01)
(52) U.S. Cl.
USPC ........... 382/254; 382/168; 382/169; 382/260; 382/261; 382/262; 382/263; 382/264; 382/265; 382/274; 345/611; 345/613; 345/617
(58) Field of Classification Search
USPC ................. 382/168, 169, 254, 260, 262, 274; 345/611, 613, 617
See application file for complete search history.

(56) References Cited

U.S. PATENT DOCUMENTS

| | | | |
|---|---|---|---|
| 4,720,871 A | 1/1988 | Chambers | |
| 4,947,446 A | 8/1990 | Jutand | |
| 5,168,375 A | 12/1992 | Reisch | |
| 5,426,684 A * | 6/1995 | Gaborski et al. | 378/62 |
| 5,432,893 A | 7/1995 | Blasubramanian et al. | |
| 5,471,987 A | 12/1995 | Nakazawa et al. | |
| 5,681,112 A | 10/1997 | Kuroda | |
| 5,870,097 A | 2/1999 | Snyder et al. | |
| 5,899,999 A | 5/1999 | De Bonet | |
| 6,034,690 A | 3/2000 | Gallery | |
| 6,163,621 A * | 12/2000 | Paik et al. | 382/169 |
| 6,347,153 B1 * | 2/2002 | Triplett et al. | 382/224 |
| 6,826,311 B2 | 11/2004 | Wilt | |
| 6,956,582 B2 | 10/2005 | Tidwell | |
| 7,010,163 B1 | 3/2006 | Weiss | |
| 7,031,543 B2 | 4/2006 | Cheng et al. | |
| 7,072,528 B2 | 7/2006 | Han | |
| 7,146,059 B1 * | 12/2006 | Durand et al. | 382/260 |
| 7,239,756 B2 | 7/2007 | Sartor | |
| 7,317,781 B2 | 1/2008 | Urushiya | |
| 7,352,911 B2 | 4/2008 | Maurer | |

(Continued)

OTHER PUBLICATIONS

Tomasi, C.; Manduchi, R.; Bilateral filtering for gray and color images Computer Vision, 1998. Sixth International Conference on Jan. 4-7, 1998 pp. 839-846.*

(Continued)

*Primary Examiner* — Matthew Bella
*Assistant Examiner* — Julian Brooks
(74) *Attorney, Agent, or Firm* — Wolfe-SBMC

(57) ABSTRACT

One embodiment of the present invention provides a system for applying a bilateral filter to an image. During operation, the system selects a first region within the image which is associated with a first pixel. Next, the system constructs a first histogram using pixel values within the first region. The system then computes a new value for the first pixel using the current value of the first pixel and the first histogram. The system then selects a second region within the image which is associated with a second pixel. Next, the system determines a non-overlapping region between the first region and the second region. The system then constructs a second histogram using the first histogram and pixel values in the non-overlapping region. Next, the system computes a new value for the second pixel using the current value of the second pixel and the second histogram.

18 Claims, 3 Drawing Sheets

(56) References Cited

U.S. PATENT DOCUMENTS

| | | |
|---|---|---|
| 7,426,312 B2 | 9/2008 | Dance et al. |
| 7,626,614 B1 | 12/2009 | Marcu |
| 7,783,121 B1 | 8/2010 | Cox |
| 7,889,923 B1 | 2/2011 | Carr et al. |
| 7,889,949 B2 | 2/2011 | Cohen et al. |
| 7,920,739 B2 | 4/2011 | Chien et al. |
| 8,059,905 B1 | 11/2011 | Christian |
| 8,160,380 B2 | 4/2012 | Das Gupta et al. |
| 8,189,944 B1 | 5/2012 | Lim |
| 8,229,211 B2 | 7/2012 | Cherna et al. |
| 8,452,122 B2 | 5/2013 | Hitomi et al. |
| 2003/0123749 A1 | 7/2003 | Cheng et al. |
| 2003/0190090 A1 | 10/2003 | Beeman et al. |
| 2004/0001643 A1 | 1/2004 | Thesen |
| 2004/0264799 A1 | 12/2004 | Gallagher |
| 2006/0034539 A1 | 2/2006 | Nachlieli et al. |
| 2006/0110063 A1 | 5/2006 | Weiss |
| 2006/0147112 A1 | 7/2006 | Park et al. |
| 2006/0153444 A1 | 7/2006 | Trimeche et al. |
| 2007/0183682 A1 | 8/2007 | Weiss |
| 2008/0144932 A1 | 6/2008 | Chien |
| 2008/0175510 A1 | 7/2008 | Matsushita |
| 2008/0298680 A1 | 12/2008 | Miller et al. |
| 2009/0317015 A1 | 12/2009 | Porikli |
| 2010/0249532 A1 | 9/2010 | Maddess et al. |
| 2010/0310156 A1 | 12/2010 | De Haan et al. |
| 2010/0329546 A1 | 12/2010 | Smith |
| 2010/0329583 A1 | 12/2010 | Whiteside et al. |
| 2011/0033118 A1 | 2/2011 | Yildiz et al. |
| 2011/0135217 A1 | 6/2011 | Su et al. |
| 2011/0268328 A1 | 11/2011 | Bar-Aviv et al. |
| 2011/0273621 A1 | 11/2011 | Richardson et al. |
| 2013/0121606 A1 | 5/2013 | Chien |

OTHER PUBLICATIONS

Ansar, A.; Castano, A.; Matthies, L.; Enhanced real-time stereo using bilateral filtering 3D Data Processing, Visualization and Transmission, 2004. 3DPVT 2004. Proceedings. 2nd International Symposium on Sep. 6-9, 2004 pp. 455-462.*

Fredo Durand and Julie Dorsey, "Fast bilateral filtering for the display of high-dynamic-range images", ACM Transactions on Graphics (TOG), Proceedings of the 29th annual conference on computer graphics and interactive techniques SIGGRAPH '02 vol. 21, Issue 3.

Qimei Hu, Xiangjian He, and Jun Zhou, "Multi-scale edge detection with bilateral filtering in apiral architecture", Proceedings of the Pan-Sydney area workshop on visual information processing VIP '05, Publisher: Australian Computer Society,Inc.

Weiss, "Fast Median and Bilateral Filtering," ACM Transactions on Graphics, vol. 25, Issue 3, Jul. 2006, Proceedings of ACM SIGGRAPH 2006, pp. 519-526.

Paris, et al., "A Fast Approximation of the Bilateral Filter Using a Signal Processing Approach," Proceedings of the European Conference on Computer Vision, 2006.

Terdiman, "Radix Sort Revisited," 2000, http://www.codercorner/com/RadixSortRevisited.html.

Huang, "A Fast Two-Dimensional Median Filtering Algorithm," Acoustics, Speech, and Signal Processing [see also IEEE Transactions on Signal Processing], IEEE Transactions, vol. 27, Issue 1, Feb. 1979, pp. 13-18.

Huttunen, H. & Yli-Harja, O., "Fast Algorithm for Updating the Local Histogram of Multidemensional Signals," Proceedings 1999 International Symposium on Nonlinear Theory and Its Applications (NOLTA '99), Hilton Waikoloa Village, Hawaii, USA, Nov. 28-Dec. 2, 1999, pp. 65-68.

Giovanni Garibotto, Livio Lambarelli, "Fast on-line Implementation of Two-Dimensional Median Filtering," Electronics Letters, vol. 15, No. 1, Jan. 4, 1979, pp. 24-25.

Williams, "Pyramidal Parametrics," Computer Graphics, vol. 17, No. 3, Jul. 1983, pp. 1-11.

Crow, "Summed-Area Tables for Texture Mapping," Computer Graphics, vol. 18, No. 3, Jul. 1984, pp. 207-212.

U.S. Appl. No. 12/323,009, filed Nov. 25, 2008.
U.S. Appl. No. 11/749,862, filed May 17, 2007.
U.S. Appl. No. 11/756,409, filed May 31, 2007.
U.S. Appl. No. 11/756,402, filed May 31, 2007.
"Color Model", Wikipedia, (Jul. 25, 2008), 8 pages.
"Color Space", Wikipedia, (Jun. 30, 2008), 7 pages.
"Final Office Action", U.S. Appl. No. 12/324,251, (May 9, 2012), 14 pages.
"Non-Final Office Action", U.S. Appl. No. 12/323,009, (Feb. 1, 2012), 12 pages.
"Non-Final Office Action", U.S. Appl. No. 12/324,251, (Dec. 20, 2012), 13 pages.
"Non-Final Office Action", U.S. Appl. No. 12/324,251, (Dec. 23, 2011), 11 pages.
"Notice of Allowance", U.S. Appl. No. 12/323,0009, (Jul. 18, 2012), 7 pages.
"U.S. Application as Filed", U.S. Appl. No. 12/324,251, (Nov. 26, 2008), 43 pages.
"YCbCr", Wikipedia, (Aug. 7, 2008), 7 pages.
Chen, Jiawen et al., "Real-time Edge-Aware Image Processing with the Bilateral Grid", ACM Transactions on Graphics, vol. 26, No. 3, Article 103, (Jul. 2007), 10 pages.
Cox, Christopher B., "U.S. Application as Filed", U.S. Appl. No. 11/292,184, (Nov. 29, 2005), 21 pages.
Liu, et al., "Automatic Estimation and Removal of Noise from a Single Image", IEEE Transactions on Pattern Analysis and Machine Intelligence, vol. 30, No. 2, Feb. 2008, (Feb. 2008), 16 pages.
Paris, Sylvain et al., "A Gentle Introduction to Bilateral Filter and its Applications", ACM SIGGRAPH 2007, (Aug. 6, 2007), 3 pages.
Porikli, Fatih "Constant Time O(1) Bilateral Filtering", Mitsubishi Electric Research Laboratories, Inc., (Jul. 2008), 10 pages.
Smith, Stephen M., et al., "SUSAN—A New Approach to Low Level Image Processing", International Journal of Computer Vision 23 (1), (1997), pp. 45-78.
"Final Office Action", U.S. Appl. No. 12/324,251, (Jun. 20, 2013),14 pages.
"Notice of Allowance", U.S. Appl. No. 12/324,251, (Oct. 4, 2013), 9 pages.

* cited by examiner

FAST BILATERAL FILTERING USING RECTANGULAR REGIONS

BACKGROUND

1. Field of the Invention

The present invention relates to computer-based tools for manipulating digital images. More specifically, the present invention relates to a method and an apparatus for efficiently applying a bilateral filter to an image.

2. Related Art

A major problem in displaying a real-world scene is that the dynamic range of color intensity values which are present in the real-world scene often greatly exceeds the dynamic range of a specific display medium which is used to display the real world scene. To solve this problem, many systems perform "HDR (High Dynamic Range) tone mapping" to reduce the dynamic range of such scenes so that they can be effectively displayed on media, such as hard-copy prints, CRT/LCD displays, and projectors. More specifically, systems that perform HDR tone mapping attempt to reduce the contrast of a natural scene so that it can be displayed on a specific display medium, while preserving image details which are critical to appreciate the original scene content.

One of the most popular techniques for HDR tone mapping is to apply a "bilateral filter" to an image. A bilateral filter is a filter that computes a new value of a pixel in the image based on the spatial closeness as well as the photometric similarity of other pixels in the image. For example, a bilateral filter may compute a new pixel value based on the values of neighboring pixels (spatial closeness) which have values that are similar (photometric similarity) to the original pixel.

Unfortunately, existing techniques for applying a bilateral filter to fan image can require a large amount of computation. More specifically, existing techniques typically use an approximation to a Gaussian function as the spatial component of the bilateral filter. Hence, to update a given pixel these existing techniques need to compute the individual contributions of each neighboring pixel during the bilateral computation. Because the range of interest is a two-dimensional area, these existing techniques typically require $O(n^2)$ operations for each pixel, where n is the radius (in number of pixels) of the filter. (Note that, big "O" notation, e.g., $O(n^2)$, is commonly used to describe the asymptotic complexity of software processes.) This is why existing techniques can be very slow, especially when the filter radius is large.

Hence, what is needed is a method and an apparatus for applying a bilateral filter to an image without the above-described performance issues.

SUMMARY

One embodiment of the present invention provides a system for applying a bilateral filter to an image. During operation, the system selects a first region within the image which is associated with a first pixel. Next, the system constructs a first histogram using pixel values within the first region. The system then computes a new value for the first pixel using the current value of the first pixel and the first histogram. The system then selects a second region within the image which is associated with a second pixel. Next, the system determines a non-overlapping region between the first region and the second region. The system then constructs a second histogram using the first histogram and pixel values in the non-overlapping region. Next, the system computes a new value for the second pixel using the current value of the second pixel and the second histogram.

In a variation on this embodiment, the first pixel is the center pixel of the first region which is rectangular in shape. Furthermore, the second pixel is the center pixel of the second region which is also rectangular in shape.

In a variation on this embodiment, the system constructs the second histogram by: setting the frequency values of the second histogram to be equal to the frequency values of the first histogram, and adjusting the frequency values of the second histogram. Specifically, the system adjusts the frequency values of the second histogram by: increasing the frequencies of pixel values that are in the second region, but are not in the first region, and decreasing the frequencies of pixel values that are in the first region, but not in the second region.

In a variation on this embodiment, the system computes the new value for the first pixel by applying a triangular filter to the first histogram, wherein the triangular filter is centered at the first pixel value.

In a variation on this embodiment, the system selects the first region by applying a 2-D box filter to the image which is centered at the first pixel value.

In a variation on this embodiment, the system is used for HDR (High Dynamic Range) tone mapping.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Filters

Figure 1A:
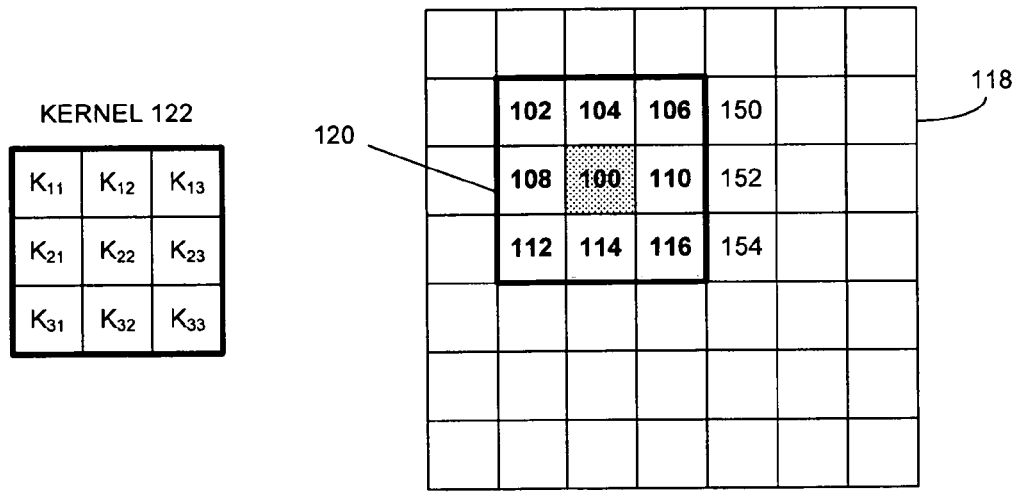
FIGS. 1A and 1B illustrate how a filter can be applied to an image in accordance with an embodiment of the present invention.
Figure 1B:
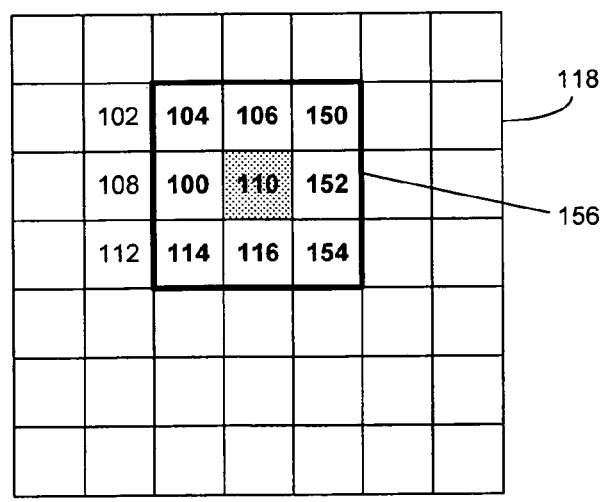

FIGS. 1A and 1B illustrate how a filter can be applied to an image in accordance with an embodiment of the present invention.

A digital image usually comprises a number of pixels. For example, FIG. 1A illustrates a portion 118 of a digital image that comprises a number of pixels, which include pixels 102, 104, 106, 108, 110, 112, 114, 116, 150, 152, and 154. Note that each pixel is usually associated with a number of attributes. Specifically, in color images, a pixel is usually associated with the intensities of the color channels.

When a filter is applied to an image, it computes new attribute values for a pixel based on the current attribute values of the pixel and attribute values of neighboring pixels. Note that a filter typically has a radius (or region of interest) which identifies the neighboring pixels that are used for computing the new attribute values. For example, the filter's computation may be restricted to the pixels within the rectangular region 120 shown in FIG. 1A.

A filter is typically applied to an image by convolving a kernel, such as kernel 122, with the image. Kernel 122 comprises kernel coefficients $K_{11}$, $K_{12}$, $K_{13}$, $K_{21}$, $K_{22}$, $K_{23}$, $K_{31}$, $K_{32}$, and $K_{33}$. In one embodiment, a new (attribute) value for pixel 100 in FIG. 1A may be computed by centering kernel 122 on pixel 100, and summing the products of the pixel values with their corresponding kernel coefficients. For example, pixel 102's value is multiplied with its corresponding kernel coefficient $K_{11}$, pixel 104's value is multiplied with its corresponding kernel coefficient $K_{12}$, and so forth. These product terms are then added up to obtain the new value for pixel 100.

Bilateral Filters

Kernel coefficients of a domain filter depend only on the spatial closeness of pixel locations. For example, if kernel 122 was a domain filter, coefficient K, would be determined based on the distance between pixel 102 (which corresponds to coefficient $K_{11}$), and pixel 100. The Gaussian filter and the mean filter are examples of domain filters.

On the other hand, kernel coefficients of a range filter depend only on the photometric similarity (i.e., similarity of pixel values) of pixels. For example, if kernel 122 was a range filter, coefficient $K_{11}$ would be determined based on the similarity between pixel 102's value and pixel 100's current value. Note that the spatial closeness of the pixels plays no role in determining the kernel coefficient for a range filter.

A bilateral filter combines both domain filtering and range filtering. In other words, the kernel coefficients of a bilateral filter depend both on the spatial closeness and the photometric similarity of the pixels. For example, if kernel 122 was a bilateral filter, coefficient $K_{11}$ would be determined based on (a) the distance between pixel 102 and pixel 100, and (b) the similarity between pixel 102's value and pixel 100's current value.

Unfortunately, prior art techniques for applying a bilateral filter are very slow. Prior art bilateral filters usually combine a Gaussian filter (spatial filter) with a range filter. To apply a bilateral filter that contains a Gaussian component, the system needs to determine the contribution of each pixel within the kernel radius. As a result, prior art techniques require $O(n^2)$ operations to compute a new pixel value, where n is the kernel radius. (Recall that, big "O" notation, e.g., $O(n^2)$, is used to describe the asymptotic complexity of software processes.) Hence, in other words, prior art techniques asymptotically require order $n^2$ operations to compute a new pixel value.

For example, prior art techniques would determine the new value of pixel 110 in FIG. 1B by calculating the contribution of all the pixels within the rectangular region 156, namely pixels 104, 106, 150, 100, 110, 152, 114, 116, and 154. It will be evident that computing the new value of pixel 110 requires $O(n^2)$ operations, where n is the filter radius (i.e., distance from the center to one of the sides of the rectangular region).

In contrast, one embodiment of the present invention applies a bilateral filter to an image using substantially less computation than prior art techniques. Specifically, the embodiment requires only $O(n)$ operations to compute a new value for a pixel.

Two important aspects enable the present invention to substantially reduce the amount of computation. First, the present invention uses a 2-D box filter (instead of a Gaussian filter) as the spatial component in the bilateral filter. Second, the present invention uses histogram techniques to speed up computation of the new pixel values.

Note that the present invention can speed up computation because it uses a 2-D box filter as the spatial component. If the spatial component was Gaussian, it would not be possible to use histogram techniques to speed up computation.

Fast Bilateral Filtering Using Rectangular Regions

Figure 2:
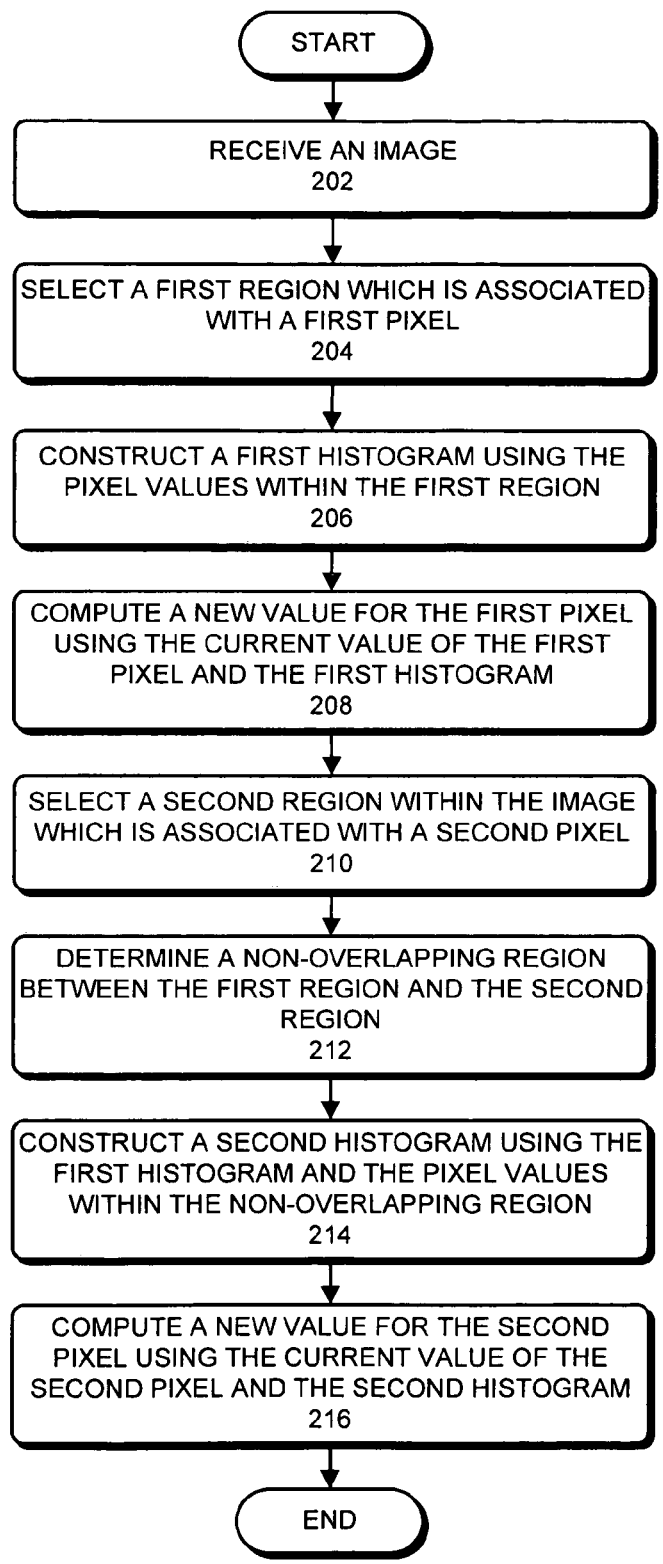
FIG. 2 presents a flowchart that illustrates a process for applying a bilateral filter to an image in accordance with an embodiment of the present invention.

FIG. 2 presents a flowchart that illustrates a process for applying a bilateral filter to an image in accordance with an embodiment of the present invention.

The process begins by receiving an image (step 202). For example, the system may receive image 118 shown in FIG. 1A.

The system then selects a first region within the image which is associated with a first pixel (step 204).

Specifically, in one embodiment, the system may select rectangular region 120 which associated with the center pixel 100. Note that selecting a rectangular region is equivalent to applying a 2-D box filter to the image. In other words, the spatial component (2-D box filter) of the bilateral filter is applied at this step.

Next, the system constructs a first histogram using the pixel values within the first region (step 206).

Figure 3A:
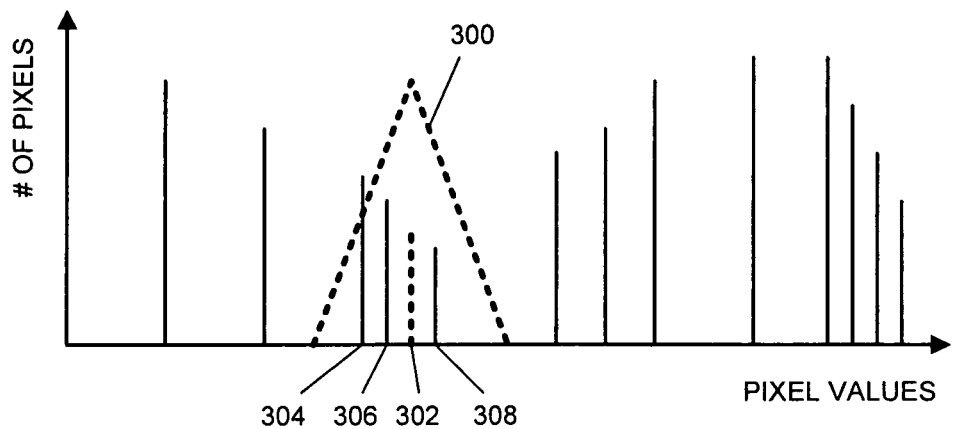
FIGS. 3A and 3B illustrate histograms that the system may construct from an image in accordance with an embodiment of the present invention.
Figure 3B:
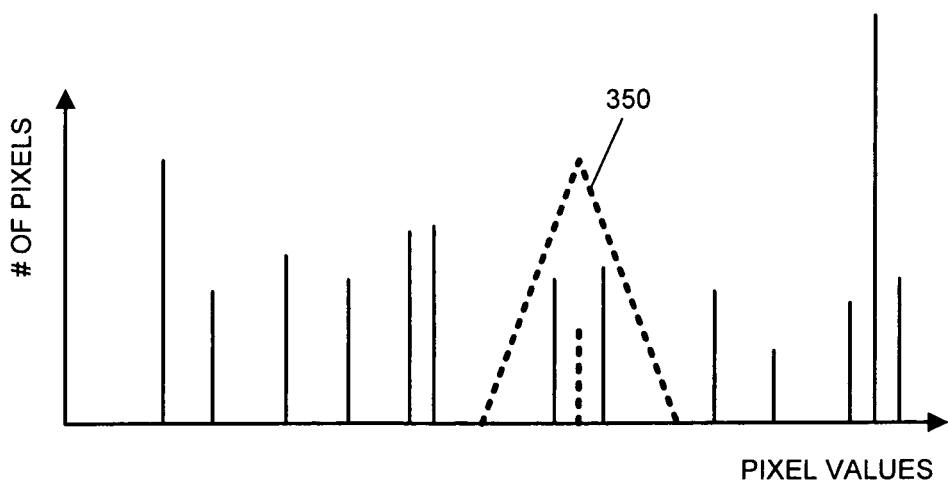

FIGS. 3A and 3B illustrate histograms that the system may construct from an image in accordance with an embodiment of the present invention. Note that the histograms plot the frequency of each pixel value against the pixel values.

The system then computes a new value for the first pixel using the current value of the pixel and the first histogram (step 208).

Note that the system can apply a variety of filters to the histogram to compute a new value for the pixel. Specifically, in one embodiment, the system applies a triangular filter to the histogram that is centered at the pixel value. In another embodiment, the system applies a 1-D box filter to the histogram that is centered at the pixel value.

For example, the system may apply triangular filter 300 which is centered at pixel value 302 to the histogram shown in FIG. 3A. Note that pixel value 302 is the current value of the pixel for which a new pixel value is being computed.

Note that applying a triangular filter to the histogram is equivalent to convolving a kernel with the image. For example, suppose a new value for pixel 100 is being computed. Let pixel values 304, 306, and 308 in FIG. 3A correspond to pixels 104, 106, and 108 in FIG. 1A, respectively. Additionally, suppose that pixels 102, 110, 112, 114, and 116 have pixel values that fall outside the range of the triangular filter 300 shown in FIG. 3A. In this case, applying triangular filter 300 to the histogram shown in FIG. 3A is equivalent to convolving with a kernel, such as kernel 122, in which the kernel coefficient associated with a pixel has a value that is equal to the triangular filter's value for associated pixel. For example, in this case, kernel coefficients $K_{11}$, $K_{23}$, $K_{31}$, $K_{32}$, and $K_{33}$ are zero because they are associated with pixels 102, 110, 112, 114, and 116, whose values lie outside the triangular filter's range. On the other hand, kernel coefficients $K_{12}$, $K_{13}$, $K_{21}$, and $K_{22}$ are non-zero, and are equal to the triangular filter's values associated with pixel values 304, 306, and 308, respectively, because these pixel values are associated with pixels 104, 106, and 108, respectively.

Continuing with FIG. 2, the system selects a second region within the image which is associated with a second pixel (step 210).

For example, the system may select rectangular region 156 shown in FIG. 1B which is associated with pixel 110. Recall that selecting a rectangular region is equivalent to applying a 2-D box filter to the image.

The system then determines a non-overlapping region between the first region and the second region (step 212).

For example, the non-overlapping region between region 120 and region 156 comprises pixels 102, 108, 112, 150, 152, and 154.

Next, the system constructs a second histogram using the first histogram and the pixel values in the non-overlapping region (step 214).

Since the present invention uses the pixel values in the non-overlapping region to update the second histogram, it can substantially reduce the number of computations required to determine the new value for the second pixel. (In contrast, prior art techniques need to use all the pixels in the second region to compute the new value for the second pixel.)

Specifically, in one embodiment, the system first sets the frequency values of the second histogram to be equal to the frequency values of the first histogram. The system then adjusts the frequencies of the second histogram by: increasing the frequencies of pixel values that are in the second region, but are not in the first region, and decreasing the frequencies of pixel values that are in the first region, but not in the second region.

For example, the system can reduce the frequencies of pixel values corresponding to pixels 102, 108, and 112, and increase the frequencies of pixel values corresponding to pixels 150, 152, and 154.

The system then computes a new value for the second pixel using the current value of the second pixel and the second histogram (step 216).

For example, the system may compute the new value for the second pixel by applying triangular filter 350 to the second histogram shown in FIG. 3B. Note that the triangular filter depends on the value of the pixel for which a new value is being computed. For example, triangular filter 300 and triangular filter 350 are centered at different pixel values.

To summarize, in one embodiment of the present invention, the spatial component of the bilateral filter is a 2-D box filter. Note that this is an important, non-obvious insight because it allows the present invention to exploit histogram techniques to substantially reduce the amount of computation. In contrast, in prior art methods, since the spatial component of the bilateral filter is Gaussian, histogram techniques cannot be used to speed up the computation. (Note that, if the spatial component is a function that assigns different weights to the pixels based on their location, computation cannot be speeded up substantially using histogram techniques.)

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art.

For example, the present invention has been described using a 2-D box filter that has a rectangular shape. However, the present invention is also applicable to any arbitrarily shaped 2-D box filter.

Further, the above disclosure is not intended to limit the present invention. The scope of the present invention is defined by the appended claims.

What is claimed is:

1. A method for manipulating an image, comprising:
using a computer to perform:
receiving an image;
selecting a first region within the image for applying a bilateral filter, wherein the first region is centered at a first pixel, and wherein the first region comprises a plurality of other pixels;
applying the bilateral filter to the first region, wherein a spatial component of the bilateral filter is a 2-D box filter, and wherein said applying comprises:
constructing a first histogram of pixel values for the pixels within the first region; and
computing a new pixel value for the first pixel, wherein said computing comprises applying a filter to the first histogram, wherein the filter applied to the first histogram is centered at a current pixel value for the first pixel.

2. The method of claim 1, further comprising:
selecting a second region within the image for applying the bilateral filter, wherein the second region is centered at a second pixel, and wherein the second region comprises a plurality of other pixels;
applying the bilateral filter to the second region, wherein a spatial component of the bilateral filter is the 2-D box filter, and wherein said applying comprises:
determining a non-overlapping region between the first region and the second region;
constructing a second histogram using the first histogram and pixel values for the pixels in the non-overlapping region; and
computing a new pixel value for the second pixel, wherein said computing comprises applying the filter applied to the first histogram to the second histogram.

3. The method of claim 2,
wherein the first region is rectangular in shape; and
wherein the second region is rectangular in shape.

4. The method of claim 2, wherein constructing the second histogram involves:
setting the frequency values of the second histogram to be equal to the frequency values of the first histogram; and
adjusting the frequency values of the second histogram by:
increasing the corresponding frequency value for each pixel that belongs to the second region, but not the first region; and
decreasing the corresponding frequency value for each pixel that belongs to the first region, but not the second region.

5. The method of claim 1, wherein the filter applied to the first histogram is a triangular filter.

6. The method of claim 1, wherein the method further comprises performing HDR (High Dynamic Range) tone mapping, wherein performing the HDR tone mapping comprises said selecting and said applying.

7. A computer-readable storage medium storing instructions that when executed by a computer cause the computer to perform a method for manipulating an image, comprising:
receiving an image;
selecting a first region within the image for applying a bilateral filter, wherein the first region is centered at a first pixel, and wherein the first region comprises a plurality of other pixels;
applying the bilateral filter to the first region, wherein a spatial component of the bilateral filter is a 2-D box filter, and wherein said applying comprises:
constructing a first histogram of pixel values for the pixels within the first region; and
computing a new pixel value for the first pixel, wherein said computing comprises applying a filter to the first histogram, wherein the filter applied to the first histogram is centered at a current pixel value for the first pixel.

8. The computer-readable storage medium of claim 7, wherein the method further comprises:
   selecting a second region within the image for applying the bilateral filter, wherein the second region is centered at a second pixel, and wherein the second region comprises a plurality of other pixels;
   applying the bilateral filter to the second region, wherein a spatial component of the bilateral filter is the 2-D box filter, and wherein said applying comprises:
      determining a non-overlapping region between the first region and the second region;
      constructing a second histogram using the first histogram and pixel values for the pixels in the non-overlapping region; and
   computing a new pixel value for the second pixel, wherein said computing comprises applying the filter applied to the first histogram to the second histogram.

9. The computer-readable storage medium of claim 8, wherein the first region is rectangular in shape; and wherein the second region is rectangular in shape.

10. The computer-readable storage medium of claim 8, wherein constructing the second histogram involves:
   setting the frequency values of the second histogram to be equal to the frequency values of the first histogram; and
   adjusting the frequency values of the second histogram by:
      increasing the corresponding frequency value for each pixel that belongs to the second region, but not the first region; and
      decreasing the corresponding frequency value for each pixel that belongs to the first region, but not the second region.

11. The computer-readable storage medium of claim 7, wherein the filter applied to the first histogram is a triangular filter.

12. The computer-readable storage medium of claim 7, wherein the method further comprises performing HDR (High Dynamic Range) tone mapping, wherein performing the HDR tone mapping comprises said selecting and said applying.

13. An apparatus, comprising:
   a computer-readable storage medium storing program instructions for manipulating an image, wherein the program instructions are computer-executable to implement:
      a receiving mechanism configured to receive an image;
      a selecting mechanism configured to select a first region within the image for applying a bilateral filter, wherein the first region is centered at a first pixel, and wherein the first region comprises a plurality of other pixels;
      a bilateral filter mechanism configured to apply the bilateral filter to the first region, wherein a spatial component of the bilateral filter is a 2-D box filter, and wherein to apply the bilateral filter the bilateral filter mechanism is configured to:
         construct a first histogram of pixel values for the pixels within the first region; and
         apply a filter to the first histogram to compute a new pixel value for the first pixel, wherein the filter applied to the first histogram is centered at a current pixel value for the first pixel.

14. The apparatus of claim 13,
   wherein the selecting mechanism is additionally configured to select a second region within the image for applying the bilateral filter, wherein the second region is centered at a second pixel, and wherein the second region comprises a plurality of other pixels;
   wherein the bilateral filter mechanism is additionally configured to apply the bilateral filter to the second region, wherein a spatial component of the bilateral filter is the 2-D box filter, and wherein to apply the bilateral filter to the second region the bilateral filter mechanism is further configured to:
      determine a non-overlapping region between the first region and the second region;
      construct second histogram using the first histogram and pixel values for the pixels in the non-overlapping region; and
      apply the filter applied to the first histogram to the second histogram to compute a new pixel value for the second pixel.

15. The apparatus of claim 14,
   wherein the first region is rectangular in shape; and
   wherein the second region is rectangular in shape.

16. The apparatus of claim 14, wherein constructing the second histogram involves:
   setting the frequency values of the second histogram to be equal to the frequency values of the first histogram; and
   adjust the frequency values of the second histogram by:
      increasing the corresponding frequency value for each pixel that belongs to the second region, but not the first region; and
      decreasing the corresponding frequency value for each pixel that belongs to the first region, but not the second region.

17. The apparatus of claim 13, wherein the filter applied to the first histogram is a triangular filter.

18. The apparatus of claim 13, wherein the program instructions are further computer-executable to implement a mechanism for performing HDR (High Dynamic Range) tone mapping, wherein the mechanism for performing HDR tone mapping comprises said selecting mechanism and said bilateral filter mechanism.

* * * * *

UNITED STATES PATENT AND TRADEMARK OFFICE
CERTIFICATE OF CORRECTION

| | | |
|---|---|---|
| PATENT NO. | : 8,594,445 B2 | Page 1 of 1 |
| APPLICATION NO. | : 11/292184 | |
| DATED | : November 26, 2013 | |
| INVENTOR(S) | : Chris B. Cox | |

It is certified that error appears in the above-identified patent and that said Letters Patent is hereby corrected as shown below:

In the Claims

Column 8, Line 38, delete "adjust" and insert -- adjusting --, therefor.

Signed and Sealed this
Eleventh Day of March, 2014

Michelle K. Lee
*Deputy Director of the United States Patent and Trademark Office*